(12) United States Patent
Yang et al.

(10) Patent No.: US 11,653,788 B2
(45) Date of Patent: May 23, 2023

(54) COOKING APPLIANCE

(71) Applicant: FOSHAN SHUNDE MIDEA ELECTRICAL HEATING APPLIANCES MANUFACTURING CO., LTD., Foshan (CN)

(72) Inventors: Baomin Yang, Foshan (CN); Dianguo Pan, Foshan (CN); Zhongbao Zhou, Foshan (CN); Ya Zhou, Foshan (CN); Xinhua He, Foshan (CN); Xiaoli Liu, Foshan (CN); Xiaokai Liu, Foshan (CN); Yuhua Huang, Foshan (CN); Yi Sun, Foshan (CN); Fei Lou, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 395 days.

(21) Appl. No.: 16/766,781

(22) PCT Filed: Jun. 8, 2018

(86) PCT No.: PCT/CN2018/090427
§ 371 (c)(1),
(2) Date: May 26, 2020

(87) PCT Pub. No.: WO2019/128117
PCT Pub. Date: Jul. 4, 2019

(65) Prior Publication Data
US 2020/0315398 A1 Oct. 8, 2020

(30) Foreign Application Priority Data

Dec. 27, 2017 (CN) ......................... 201711446836.4
Dec. 27, 2017 (CN) ......................... 201711448387.7

(Continued)

(51) Int. Cl.
*A47J 36/10* (2006.01)
*A47J 27/00* (2006.01)
*A47J 27/086* (2006.01)

(52) U.S. Cl.
CPC ............. *A47J 36/10* (2013.01); *A47J 27/004* (2013.01); *A47J 27/002* (2013.01); *A47J 27/086* (2013.01)

(58) Field of Classification Search
CPC ........ A47J 27/00; A47J 27/002; A47J 27/004; A47J 27/08; A47J 27/0802; A47J 27/0804;
(Continued)

(56) References Cited

FOREIGN PATENT DOCUMENTS

CH       658438 A5    11/1986
CN    202619335 U    12/2012
(Continued)

OTHER PUBLICATIONS

Japan Patent Office (JPO) Notification of reason for rejection for JP Application No. 2020-535585 dated Jun. 15, 2021 11 Pages (Translation Included).

(Continued)

*Primary Examiner* — Hung D Nguyen
(74) *Attorney, Agent, or Firm* — Anova Law Group, PLLC

(57) ABSTRACT

A cooking appliance includes a base, a cover body pivotally mounted at the base, a pivot spring provided at a pivot connection member between the base and the cover body, and an attraction assembly including a first attraction member provided at the base and a second attraction member provided at the cover body. The first attraction member and the second attraction member are configured to attract each other to lock the cover body to the base.

20 Claims, 14 Drawing Sheets

(30) Foreign Application Priority Data

Dec. 27, 2017 (CN) .......................... 201721861605.5
Dec. 27, 2017 (CN) .......................... 201721885495.6
Dec. 27, 2017 (CN) .......................... 201721885605.9
Dec. 27, 2017 (CN) .......................... 201721886233.1

(58) Field of Classification Search
CPC .. A47J 27/0806; A47J 27/0815; A47J 27/082; A47J 27/086; A47J 27/09; A47J 27/12; A47J 36/06; A47J 36/10; A47J 36/12; A47J 36/2483; A47J 36/321
See application file for complete search history.

(56) References Cited

FOREIGN PATENT DOCUMENTS

| CN | 102918965 | A | 2/2013 | | |
| CN | 203447061 | U | 2/2014 | | |
| CN | 205568748 | U | 9/2016 | | |
| CN | 106175574 | A | 12/2016 | | |
| CN | 106213976 | A | 12/2016 | | |
| CN | 106678427 | A | 5/2017 | | |
| CN | 206560346 | U | 10/2017 | | |
| JP | S55020259 | Y | 5/1980 | | |
| JP | S58029016 | U | 8/1981 | | |
| JP | H05198152 | A | 8/1993 | | |
| JP | 2000051085 | A | 2/2000 | | |
| JP | 2005304522 | A | 11/2005 | | |
| JP | 2007139588 | A | 6/2007 | | |
| JP | 2010263935 | A | 11/2010 | | |
| JP | 2018-175671 | A | * | 11/2018 | .............. A47J 27/00 |
| KR | 20010048286 | A | | 6/2001 | |
| KR | 100871092 | B1 | | 11/2008 | |
| KR | 20-046261 | Y1 | * | 8/2012 | ............ A47J 27/004 |

OTHER PUBLICATIONS

World Intellectual Property Organization (WIPO) Written Opinion for PCT/CN2018/090427 with translation Aug. 16, 2018 10 Pages.
World Intellectual Property Organization (WIPO) International Search Report for PCT/CN2018/090427 dated Aug. 16, 2018 8 Pages.

* cited by examiner

COOKING APPLIANCE

CROSS-REFERENCE TO RELATED APPLICATIONS

This application is a National Stage Entry under 35 U.S.C. § 371 of International Application No. PCT/CN2018/090427, filed Jun. 8, 2018, which claims priority to Chinese Application Nos. 201711446836.4, 201711448387.7, 201721861605.5, 201721885495.6, 201721885605.9, 201721886233.1, all filed Dec. 27, 2017. The entire contents of all of the above-noted applications are incorporated herein by reference.

TECHNICAL FIELD

The present disclosure relates to the field of home appliances, in particular to a cooking appliance.

BACKGROUND

In home appliances such as electric rice cookers, in order to facilitate fitting a top cover to the cooker body, usually a set of cover locking mechanism is provided for fitting and locking the top cover, and such a cover locking mechanism is usually a mechanical snap-fit locking structure, such as a pressing-type locking mechanism.

The mechanical snap-fit locking structure added on the product needs to have a compact structure and small space occupation to avoid adversely affecting the appearance of the product too much, but more or less it makes the appearance of the product more complex and adversely affects the appearance design of the product.

In addition, in order to ensure smooth cover opening/closing operation, the mechanical snap-fit locking structure shall not only be small in size but also have very accurate dimensions; otherwise phenomena such as accident cover unlocking or closing failure may occur, directly affecting the normal use of the cooking appliance.

Moreover, since the mechanical snap-fit locking button is usually arranged on the cover body, the user may be scalded easily by the high-temperature vapor during the operation.

SUMMARY

The object of the present disclosure is to provide a cooking appliance, which has advantages including simple cover opening/closing structure, low cost, accurate control and convenient user operation.

To achieve the above object, the present disclosure provides a cooking appliance, which comprises a base and a cover body pivotally mounted at the base in an openable/closable manner, wherein the cooking appliance further comprises:

a pivot spring provided at a pivot connection member between the base and the cover body; and an attraction assembly comprising a first attraction member and a second attraction member, wherein one of the first attraction member and the second attraction member is provided at the base, the other of the first attraction member and the second attraction member is provided at the cover body, and the first attraction member and the second attraction member attract each other to lock the cover body at the base.

Preferably, in a closed state of the cover body, a return torque M2 of the pivot spring is smaller than the sum of an attraction torque M3 of magnetic attraction force between the magnet and the iron core rod and a gravity center torque M1 of the cover body with respect to a pivot hinge point between the cover body and the base.

Furthermore, a condition M3−(M2−M1)>1 Nm is met.

Furthermore, a condition M3−(M2−M1)<15 Nm is met.

Optionally, the attraction assembly preferably is a magnetic attraction lock assembly and provided at a distal end with respect to the pivot connection member.

The attraction assembly may comprise a first magnetic attraction member and a second magnetic attraction member as the first attraction member and the second attraction member respectively, one of the first magnetic attraction member and the second magnetic attraction member is provided at the base, the other of the first magnetic attraction member and the second magnetic attraction member is provided at the cover body, and the first magnetic attraction member and the second magnetic attraction member magnetically attract each other to lock the cover body at the base.

In a specific embodiment, the first attraction member is a magnet, and the second attraction member is an iron core rod. The magnet may be a permanent magnet or an electromagnet, and the iron core rod may be a separate iron rod or iron block or an iron core of an electromagnet;

wherein preferably the iron core rod is a telescopically movable rod capable of moving between the proximal position and the distal position with respect to the magnet in the closed state of the cover body;

wherein at the proximal position, the sum of the attraction torque M3 of the magnetic attraction force between the magnet and the iron core rod and the gravity center torque M1 of the cover body is greater than the return torque M2 of the pivot spring with respect to the pivot hinge point between the cover body and the base, so as to lock the cover body;

at the distal position, the sum of the attraction torque M3 of the magnetic attraction force between the magnet and the iron core rod and the gravity center torque M1 of the cover body is smaller than the return torque M2 of the pivot spring, so as to open the cover body.

Preferably, the cooking appliance further comprises a shift lever mechanism having a shift lever switch, wherein the shift lever mechanism shifts the iron core rod from the proximal position toward the distal position when the shift lever switch is triggered. That is to say, the distance between the magnet and the iron core rod is adjusted by mechanically shifting the shift lever, and thereby the mutual magnetic attraction force is adjusted.

Furthermore, the cooking appliance comprises an electromagnet circuit having an electromagnet including an iron core rod and a conductive winding wound on the iron core rod.

Preferably, the electromagnet circuit is provided with a circuit switch for controlling the energization of the electromagnet. The circuit switch may be used to control the ON/OFF of the electromagnet circuit so as to control the energization of the electromagnet and thereby control the mutual magnetic attraction force.

More preferably, in an ON state of the circuit switch, the iron core rod is configured to move from the proximal position toward the distal position so that it is further inserted into the conductive winding of the electromagnet, wherein the end of the iron core rod proximal to the magnet may be formed as a big end to facilitate magnetic attraction.

Preferably, the electromagnet circuit comprises a current reversing switch, which is configured to switch the flow direction of the current flowing through the electromagnet, and enables the electromagnet to generate magnetic repulsion force with respect to the magnet to open the cover body or switch to generate magnetic attraction force with respect to the magnet to achieve self-locking of the cover body.

Preferably, when the cover body is in the closed state and the electromagnet is in an energized state, the sum of a magnetic repulsion torque M4 of magnetic repulsion force between the magnet and the electromagnet and the return torque M2 of the pivot spring is greater than the gravity center torque M1 of the cover body with respect to the pivot hinge point.

Furthermore, a condition M4+M2−M1>1 Nm is met.

Preferably, the electromagnet circuit comprises a slide rheostat having a slide switch, and the cover body can be locked or opened by shifting the slide switch to change the magnetic attraction force between the electromagnet and the magnet. That is to say, the magnitude of the magnetic attraction force is adjusted by means of the slide rheostat.

Preferably, the electromagnet is an AC electromagnet.

Preferably, the magnet may also be an electromagnet.

Further preferably, in the case that the magnetic attraction lock assembly comprises a first magnetic attraction member and a second magnetic attraction member, the cooking appliance may further comprise a magnetic-shielding assembly comprising a magnetic-shielding sheet made of a magnetic-shielding material and a magnetic-shielding button with a return spring, and the magnetic-shielding button is capable of driving the magnetic-shielding sheet to extend into a space between the first magnetic attraction member and the second magnetic attraction member to inhibit magnetic attraction when the magnetic-shielding button is in a pressed state.

Wherein the magnetic-shielding sheet may be formed into a frame structure with an open end, and the first magnetic attraction member or the second magnetic attraction member is framed inside the frame structure when the magnetic-shielding button is in the pressed state.

Wherein the magnetic-shielding assembly may be provided in the base, and the magnetic-shielding sheet preferably is selected as an aluminum alloy sheet, a stainless steel sheet or a copper sheet, etc.

Preferably, the cooking appliance is an electric cooker, wherein the cover body preferably has a rectangular profile including a first edge of rectangle, a second edge of rectangle, a third edge of rectangle and a fourth edge of rectangle, which are sequentially connected, the pivot hinge point between the cover body and the base is formed at a midpoint position of the first edge of rectangle, the attraction assembly is arranged at a midpoint position of the third edge of rectangle and/or the attraction assembly is arranged at a symmetrical position of the second edge of rectangle and the fourth edge of rectangle.

In the cooking appliance according to the present disclosure, an attraction assembly is employed in replacement of the conventional mechanical snap-fit locking structure, the two magnet units of the attraction assembly may be arranged on the cover body and the base respectively, and the cover can be closed simply by making the two magnet units aligned to each other in the vertical direction. Therefore, the attraction assembly has a simple structure, is easy and convenient to assemble, does not require high-precision manufacturing and assembling, does not affect the appearance of the product after assembling, is more convenient for the user to operate, and can realize cover opening/closing simply by manipulating a button to controlling the magnetic suction or magnetic repulsion effect. Base on the structure, with the parameter optimization design, etc., a good cover self-locking and automatic cover opening effect can be achieved. Moreover, the present disclosure can save energy, has an improved service life and lower overall cost, and can be more widely applied to different cooking appliances.

Other features and advantages of the present disclosure will be further detailed in the embodiments hereunder.

BRIEF DESCRIPTION OF DRAWINGS

The accompanying drawings are provided here to facilitate further understanding of the present disclosure, and constitute a part of this document. They are used in conjunction with the following embodiments to explain the present disclosure, but do not constitute any limitation to the present disclosure. In the figures.

REFERENCE NUMBERS

| 1 | Pivot Spring | 2 | Pivot Shaft |
|---|---|---|---|
| 3 | Magnet | 4 | Iron Core Rod |
| 5 | Circuit Switch | 6 | Magnetic-shielding sheet |
| 7 | Magnetic-shielding button | 8 | Slide Rheostat |
| 9 | Linkage Switch | | |
| 41 | Big End | OO' | Pivot Hinge Point |
| 100 | Cover Body | 200 | Base |
| P1~P5 | Attraction Assembly Arrangement Position | | |

DETAILED DESCRIPTION OF THE EMBODIMENTS

Hereunder some embodiments of the present disclosure will be detailed with reference to the accompanying drawings. It should be understood that the embodiments described here are only provided to describe and explain the present disclosure rather than constitute any limitation to the present disclosure.

In the present disclosure, unless otherwise specified, the words that denote directions or orientations, such as "above," "below," "top," and "bottom", etc., are usually used to describe the relative position relations among the components with respect to the direction shown in the accompanying drawings or the vertical, plumb, or gravity direction.

Figure 1:
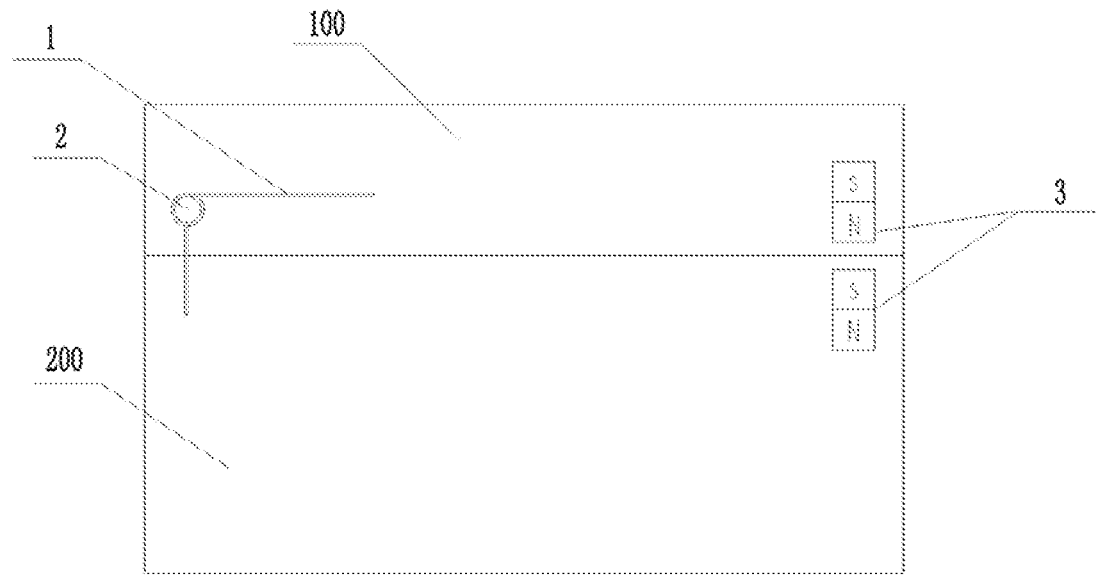
FIG. 1 is a schematic view of the cover opening/closing mechanism of the cooking appliance in a first preferred embodiment of the present disclosure.

The present disclosure provides a novel cooking appliance. As shown in FIG. 1, the cooking appliance comprises a base 200 and a cover body 100, the cover body 100 pivotally mounted at the base 200 in an openable/closable manner, wherein a pivot spring 1 (e.g., torsion spring, etc.) sleeved on a pivot shaft 2 is provided at a pivot connection member between the base 200 and the cover body 100, and the distal ends of the base 200 and the cover body 100 with respect to the pivot connection member are provided with an attraction assembly for opening/closing a cover.

The attraction assembly for controlling cover opening/closing may comprise a first attraction member and a second attraction member, one of which is provided at the base 200 and the other is provided at the cover body 100, and the first attraction member and the second attraction member attract each other to lock the cover body 100 at the base 200. Such an attraction assembly may achieve attraction closing in a variety of ways, such as vacuum suction closing, or magnetic attraction lock as detailed below, etc.

Apparently, an attraction assembly is employed in the product provided by the present disclosure in replacement of the traditional mechanical snap-fit locking structure. The attraction assembly does not require structural fitting or direct contact, has low requirements for manufacturing accuracy, assembling shape and position accuracy and the like, and even is not limited to an exposed form, which is to say, the attraction assembly may be designed into a concealed form, i.e., may be concealed in the main body of the product, without affecting the appearance of the product at all.

In an embodiment shown in FIG. 1, magnetic attraction closing can be realized simply by mounting magnets 3 at the respective distal ends of the cover body 100 and the base 20, wherein both the first attraction member (or first magnetic attraction member) and the second attraction member (or second magnetic attraction member) are magnets 3. When the cover is closed, self-locking of the cover body can be realized by virtue of the magnetic attraction force between the magnets 3. The cover may be opened manually when needed.

Figure 2:
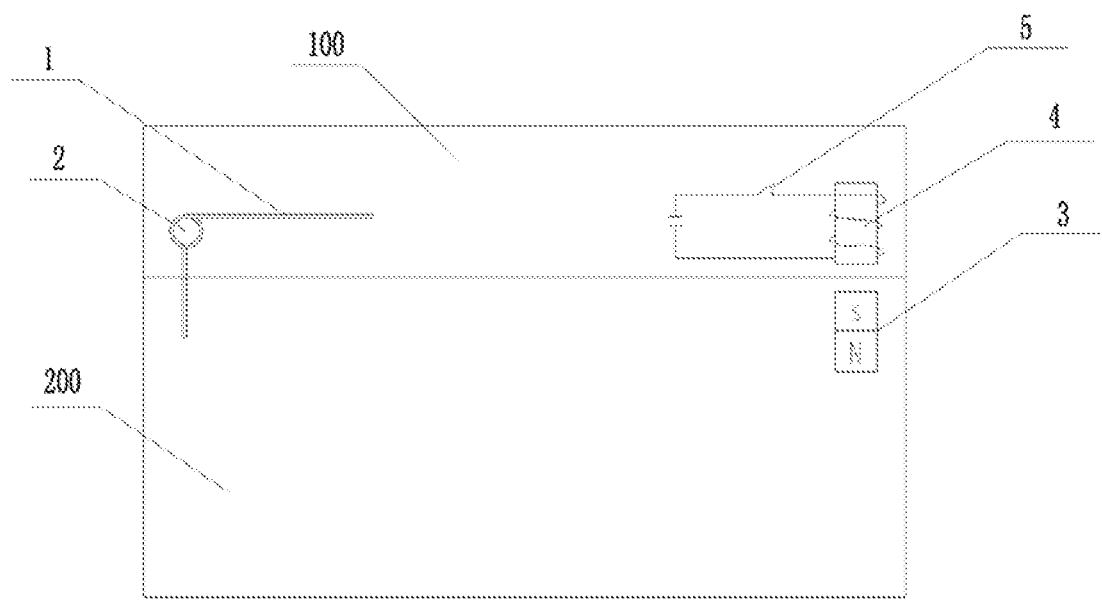
FIG. 2 is a schematic view of the cover opening/closing mechanism of the cooking appliance in a second preferred embodiment of the present disclosure.
Figure 3:
FIG. 3 is a schematic view of the cover opening/closing mechanism of the cooking appliance shown in FIG. 2 in a cover opening prevention (cover self-locking) stage.
Figure 4:
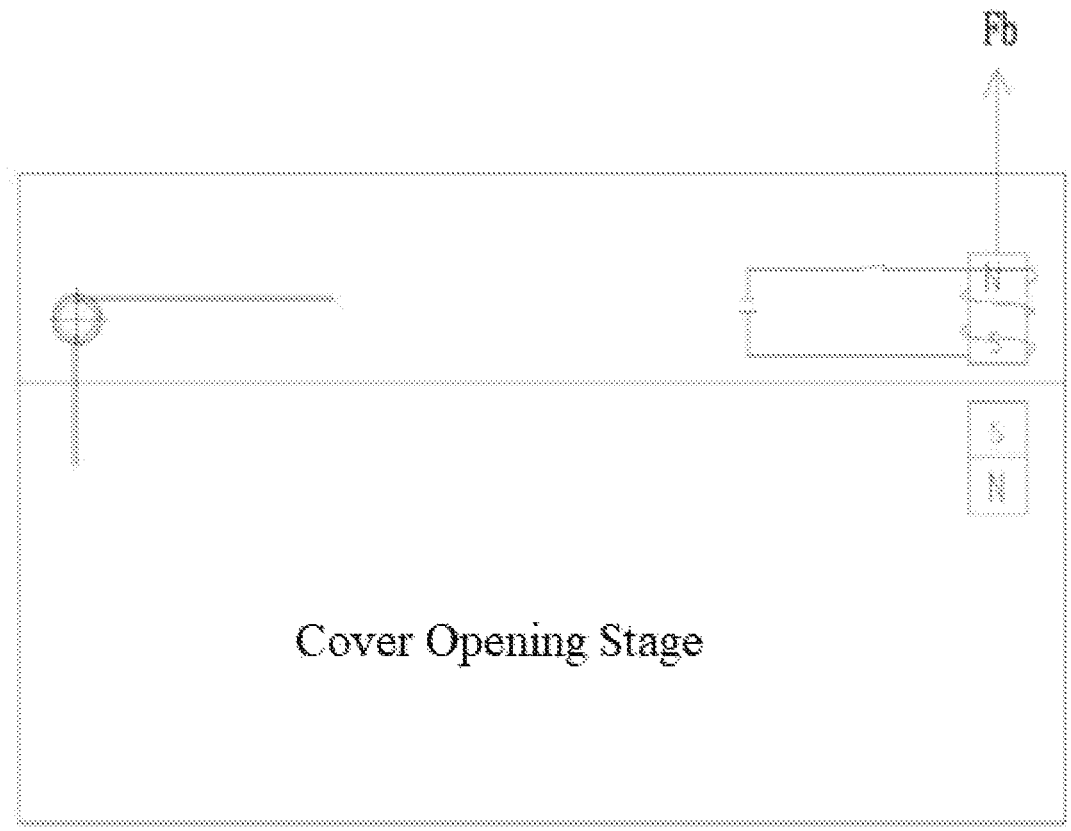
FIG. 4 is a schematic view of the cover opening/closing mechanism of the cooking appliance shown in FIG. 2 in a cover opening stage.
Figure 5:
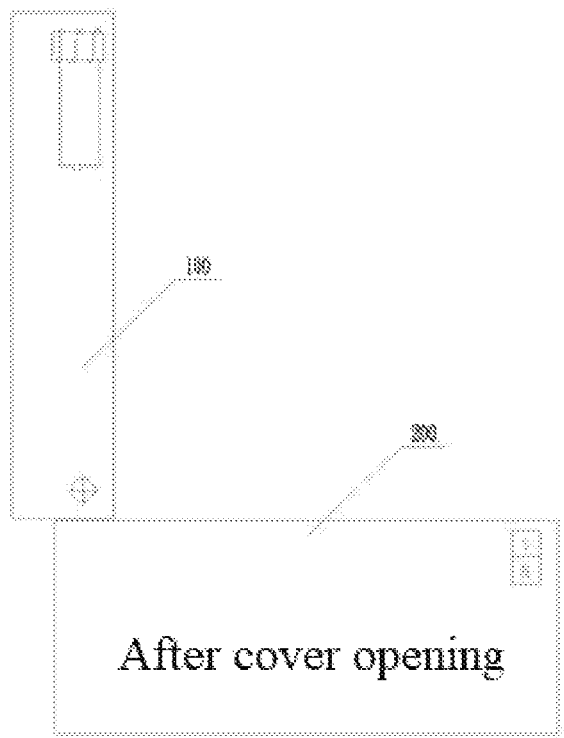
FIG. 5 is a schematic structural diagram of the cooking appliance shown in FIG. 2 after the cover is opened.

The magnets 3 are not limited to permanent magnets, but alternatively may be electromagnets with adjustable magnetic attraction force, or the like. As shown in FIG. 2, the attraction assembly in another embodiment comprises a magnet 3 serving as the first attraction member and an electromagnet circuit with an iron core rod 4 serving as the second attraction member. One of the magnet 3 and the electromagnet circuit is disposed on the distal end of the base 200 and the other of the magnet 3 and the electromagnet circuit is disposed on the distal end of the cover body 100, and the magnet 3 locks the cover body 100 by magnetically attracting the iron core rod 4. Wherein magnetic attraction force exists between the iron core rod 4 itself and the magnet 3. After the electromagnet is formed by energization, the magnetic attraction force can be increased, but magnetic repulsion force may be created alternatively. In that way, the cover may be automatically opened/closed by means of the electromagnet circuit further. For example, in the cover opening prevention stage as shown in FIG. 3, since self-locking of the cover body is needed, enhanced magnetic attraction force, i.e., Fa indicated by the arrow in the figure, is generated between the electromagnet and the magnet. In the cover opening stage as shown in FIG. 4, the polarity of the electromagnet is reversed so that magnetic repulsion force Fb is generated between the electromagnet and the magnet to automatically open the cover, as shown in FIG. 5.

As shown in FIG. 2, the electromagnet circuit is provided with a circuit switch 5 for controlling the energization of the electromagnet. When the circuit switch 5 is pressed so that enhanced magnetic attraction force is generated between the electromagnet and the magnet, the circuit switch 5 serves as a cover self-locking switch button. When the circuit switch 5 is pressed so that enhanced magnetic repulsion force is generated between the electromagnet and the magnet, the circuit switch 5 serves as a cover opening button.

Usually, the electromagnet circuit is electrically connected to the power supply of the cooking appliance, i.e., it is usually an AC electromagnet. Of course, the electromagnet circuit may also have its own power source, such as a power battery, to form a DC electromagnet. Those skilled in the art know well the fact that an AC electromagnet has a characteristic of relatively constant suction force, but may produce slight vibrations in the attraction process, and the winding coil of the electromagnet may be over-heated. A DC electromagnet doesn't produce any vibration and the winding coil is not subjected to overheat in the attraction process, but the attraction force of a DC electromagnet increases gradually. Therefore, the energization modes of the electromagnets have their respective advantages and disadvantages. The specific electromagnets to be used should be designed specifically according to the product, and will not be detailed here anymore.

When the electromagnet circuit is electrically connected to the power supply of the cooking appliance, the self-locking of the cover body is realized depending on the magnetic attraction force between the magnet 3 and the iron core rod 4, and the cover body 100 may be opened manually, if the product is not energized. The self-locking can be further enhanced by the electromagnet, and the cover body 100 can be opened automatically by reversing the polarity of the electromagnet, if the product is energized.

Figure 17:
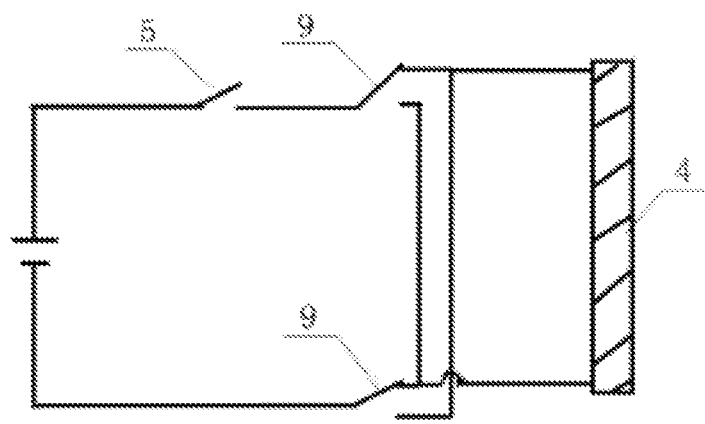
FIG. 17 is a schematic circuit diagram of an exemplary current reversing switch.

Wherein, whether connected to AC power supply or DC power supply, the electromagnet circuit preferably comprises a current reversing switch for switching the current flowing through the electromagnet so as to reverse the polarity of the electromagnet timely during cover opening/closing, i.e. the current reversing switch enables the electromagnet to generate magnetic repulsion force against the magnet 3 to open the cover body 100 or switch to generate magnetic attraction force with respect to the magnet 3 so as to achieve self-locking of the cover body 100. Such a current reversing switch may be implemented by means of a program setting of the power supply control unit or a simple bridge switch circuit. As shown in FIG. 17, in an example, two linkage switches 9 form a current reversing switch, and may work in combination with a bridge circuit to realize the current reversing for the electromagnet. Therefore, the current reversing switch may be embodied as a physical switch or a virtual button displayed on a display screen, etc., which are common general knowledge known to those skilled in the art and will not be detailed here.

Figure 6:
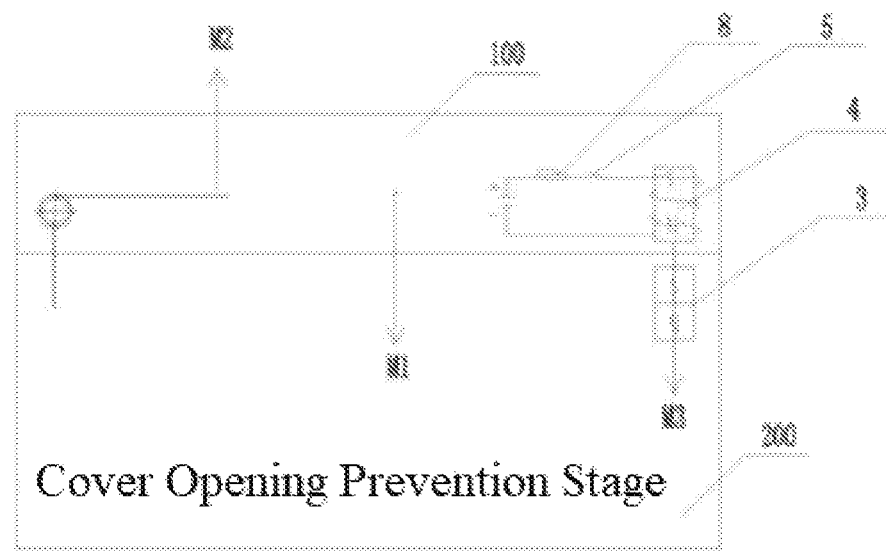
FIG. 6 is a schematic diagram of the cover opening/closing mechanism of the cooking appliance in a third preferred embodiment of the present disclosure, showing the moment analysis of the cover opening/closing mechanism in the cover opening prevention stage.
Figure 7:
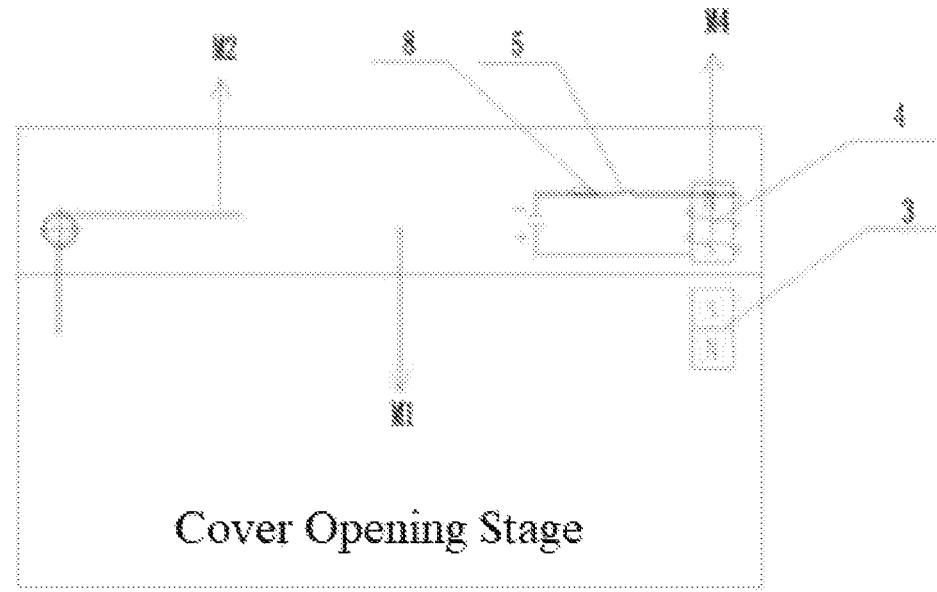
FIG. 7 shows the moment analysis of the cover opening/closing mechanism of the cooking appliance shown in FIG. 6 in the cover opening stage.

Particularly, the magnitude of the current in the electromagnet circuit may be altered, in order to further realize gradual adjustment of the magnitude of the magnetic attraction force or magnetic repulsion force and facilitate self-locking or automatic cover opening. Similarly, those skilled in the art can understand that such current magnitude adjustment may be implemented by means of a variety of simple external circuits or controlled by a controller. In a specific embodiment of the present disclosure, as shown in FIGS. 6 and 7, the electromagnet circuit comprises a slide rheostat 8 with a slide switch connected in shunt with the electromagnet. Thus, the cover body 100 may be locked or opened by shifting the slide switch to alter the magnetic attraction force between the electromagnet and the magnet 3. In that way, the slide rheostat 8 may be utilized to realize gradual adjustment control of the electromagnetic attraction force by altering the current.

As shown in FIGS. 8-12, in another preferred embodiment of the present disclosure, the iron core rod 4 is preferably a telescopically movable rod that can move between a proximal position and a distal position with respect to the magnet 3. In the closed state of the cover body 100, the magnetic attraction force between the iron core rod 4 and the magnet 3 is relatively high at the proximal position and the cover body 100 is kept in the closed state; the magnetic attraction force between the iron core rod 4 and the magnet 3 is weakened at the distal position and the cover body 100 can be pivotally opened automatically to the open state shown in FIG. 12. Thus, automatic cover locking and opening can be achieved excellently by designing the parameters of the iron core rod 4, such as the moving stroke and spacing, etc.

Figure 8:
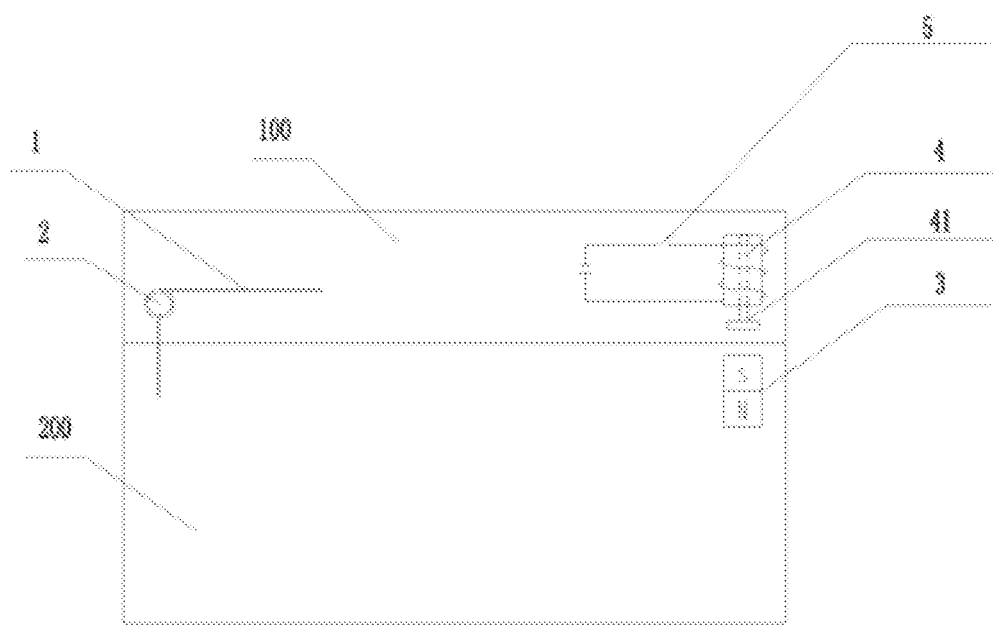
FIG. 8 is a schematic view of the cover opening/closing mechanism of the cooking appliance in a fourth preferred embodiment of the present disclosure.
Figure 9:
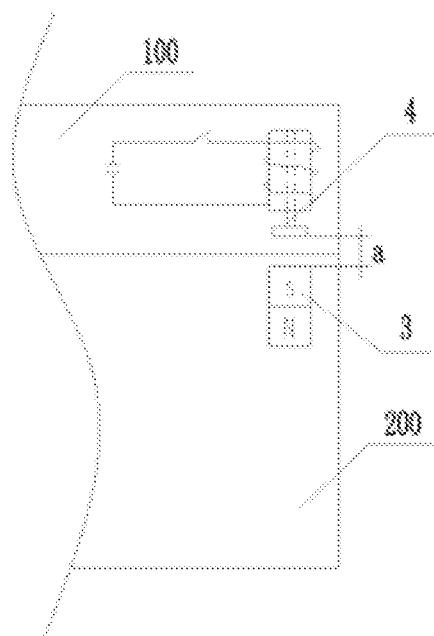
FIG. 9 is a partially enlarged view of the attraction assembly in FIG. 8.
Figure 10:
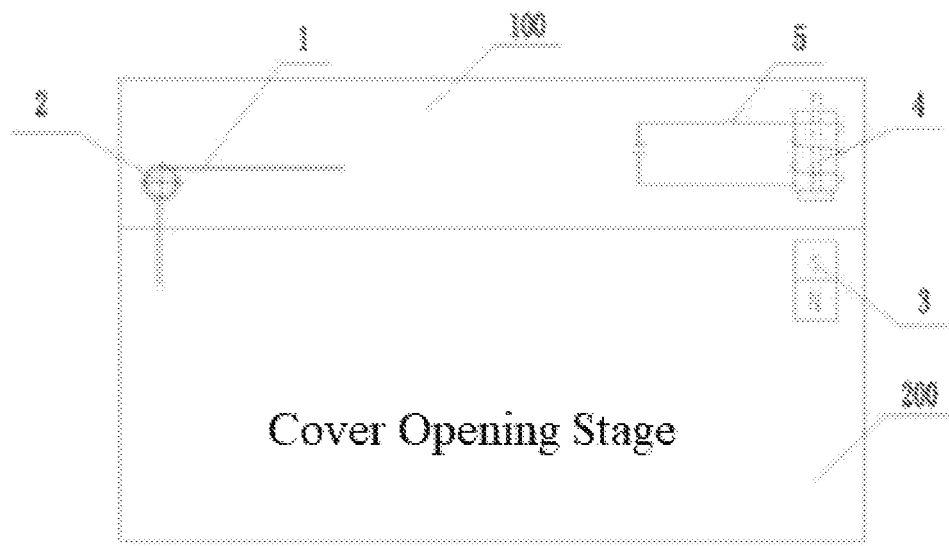
FIG. 10 is a schematic structural diagram of the cooking appliance shown in FIG. 8 in the cover opening stage.
Figure 11:
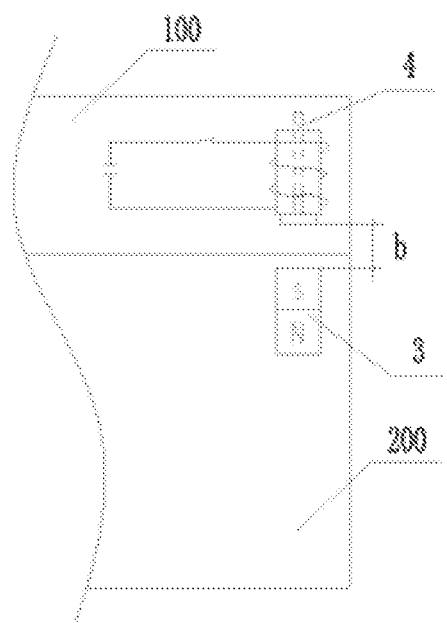
FIG. 11 is a partially enlarged view of the attraction assembly in FIG. 10.
Figure 12:
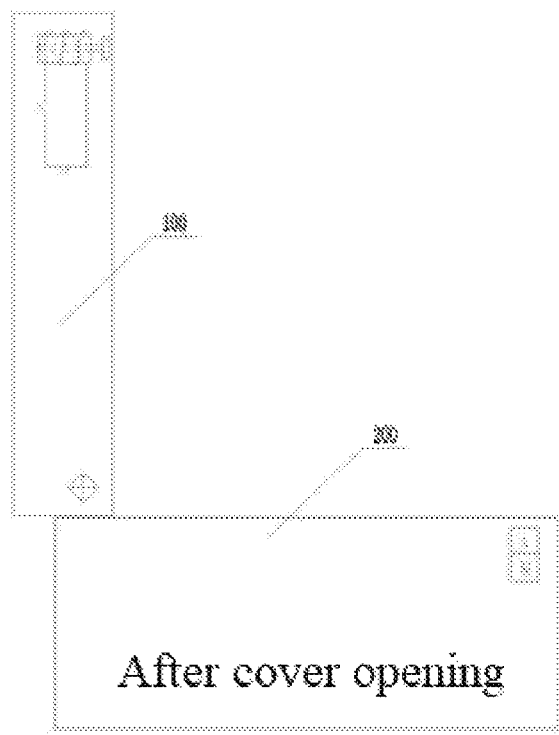
FIG. 12 is a schematic structural diagram of the cooking appliance shown in FIG. 8 after the cover is opened.

Specifically, at the proximal position shown in FIGS. 8 and 9, the minimum spacing between the iron core rod 4 and the magnet 3 is a. With respect to the pivot hinge point between the cover body 100 and the base 200, the sum of the attraction torque of the magnetic attraction force between the magnet 3 and the iron core rod 4 and the gravity center torque of the cover body 100 should be greater than the return torque of the pivot spring 1 in order to realize the closing of the cover body; at the distal position shown in FIGS. 10 and 11, the minimum spacing between the iron core rod 4 and the magnet 3 is increased to b, and the sum of the attraction torque of the magnetic attraction force between the magnet 3 and the iron core rod 4 and the gravity center torque of the cover body 100 should be smaller than the return torque of the pivot spring 1 in order to open the cover body 100 automatically. After the cover body 100 is opened, as shown in FIG. 12, the iron core rod 4 therein is reset to the iron core rod position shown in FIGS. 8 and 9.

Figure 18A:
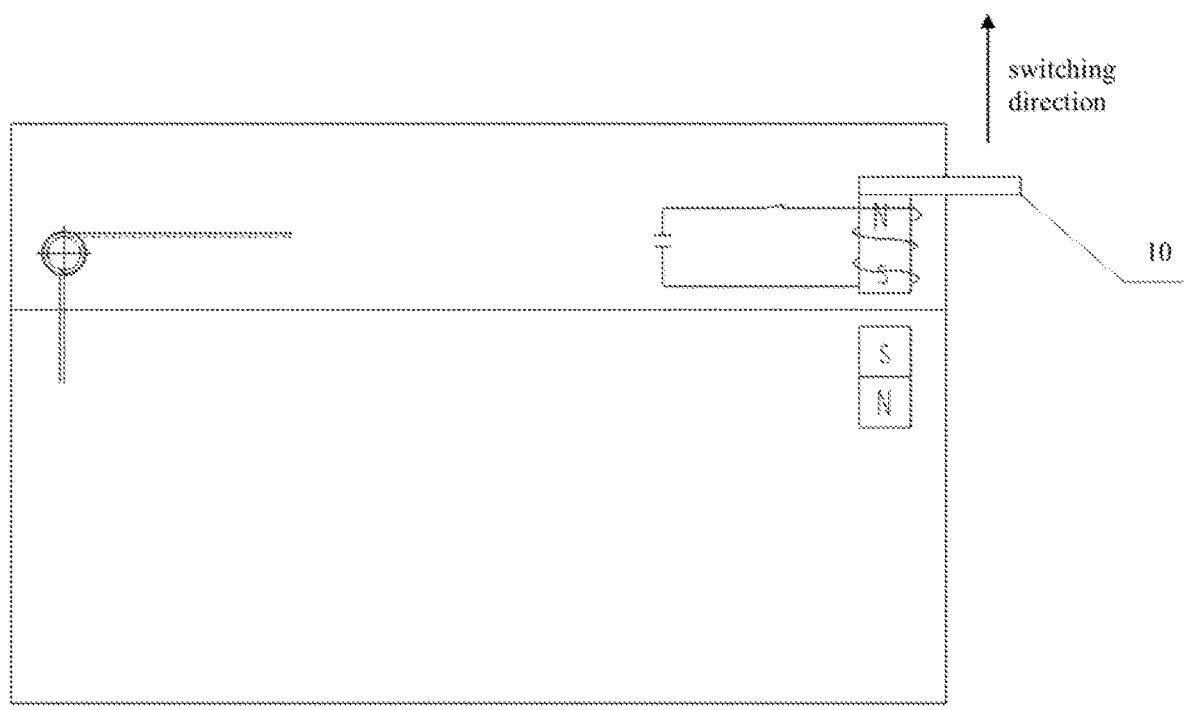
FIGS. 18A-18C are schematic views of the cover opening/closing mechanism of the cooking appliance consistent with the present disclosure
Figure 18B:
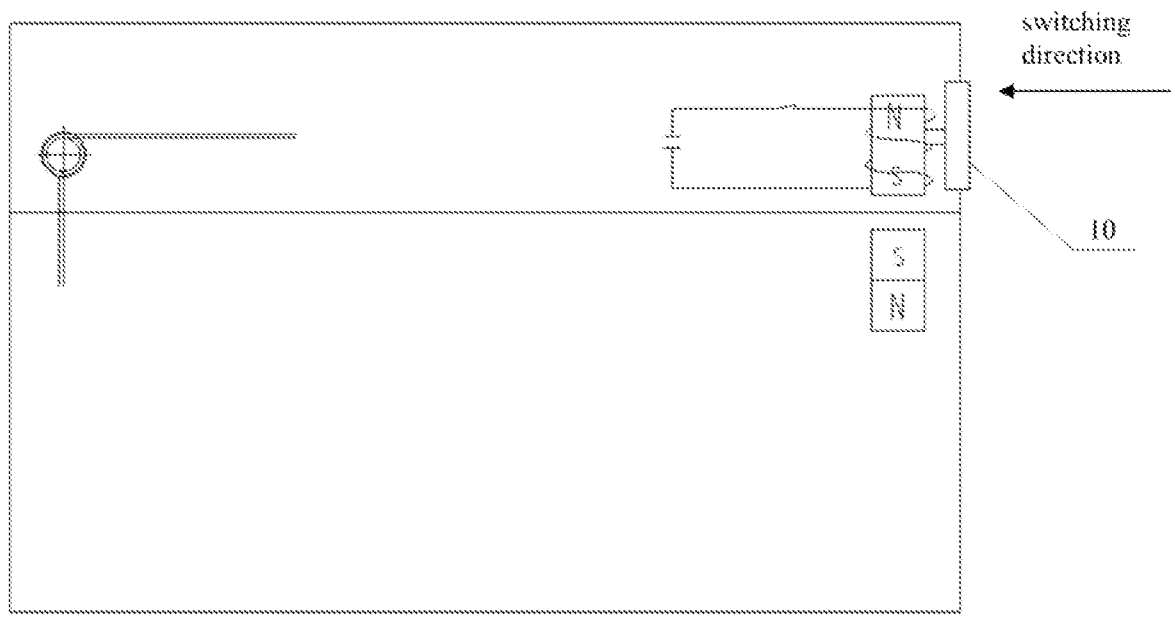
Figure 18C:
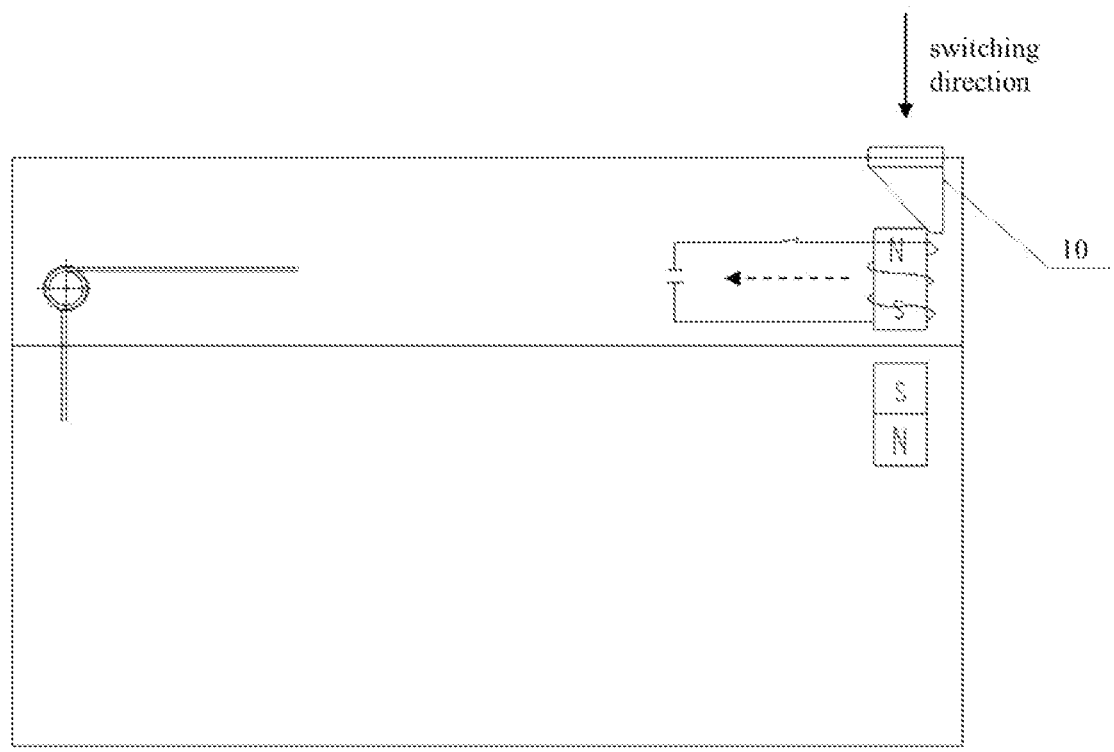

In order to realize the cooperative movement of the iron core rod 4 for opening or closing the cover, in an embodiment, the cooking appliance may comprise a shift lever mechanism 10 (shown in FIGS. 18A-18C) with a shift lever switch. When the shift lever switch is triggered, the shift lever mechanism 10 shifts the iron core rod 4 from the proximal position to the distal position, i.e. moves the iron core rod 4 away from the magnet 3 under external force. In that way, the shift lever switch is configured as a cover opening button. Usually, the iron core rod 4 is disposed in the cover body 100, as shown in FIG. 8. In that case, the shift lever switch may also be disposed accordingly on the face cover of the cover body 100 to facilitate the user to press and operate.

The aforesaid iron core rod 4 may be a separate iron rod or iron block. Furthermore, the attraction assembly may comprise an electromagnet circuit provided with an electromagnet. As shown in FIG. 9, the electromagnet comprises an iron core rod 4 and a conductive winding wound around the iron core rod 4. In that case, the iron core rod 4 is an induction iron core of the electromagnet. In an energized state of the electromagnet, the iron core rod 4 can move away from the magnet 3 automatically under the magnetic attraction force, and the electromagnet is turned into the state shown in FIG. 11 from the state shown in FIG. 9. Here, the electromagnet circuit comprises a circuit switch 5 serving as an iron core rod movement control valve. In the ON state of the circuit switch 5, the iron core rod 4 moves from the proximal position to the distal position so that it is further inserted into the conductive winding. Furthermore, in the ON state of the circuit switch 5, the electromagnet can be configured to generate magnetic repulsion force against the magnet 3, which is more favorable for opening the cover body 100. Wherein preferably the proximal end of the iron core rod 4 with respect to the magnet 3 is formed as a big end 41 to facilitate magnetic attraction.

Figure 13:
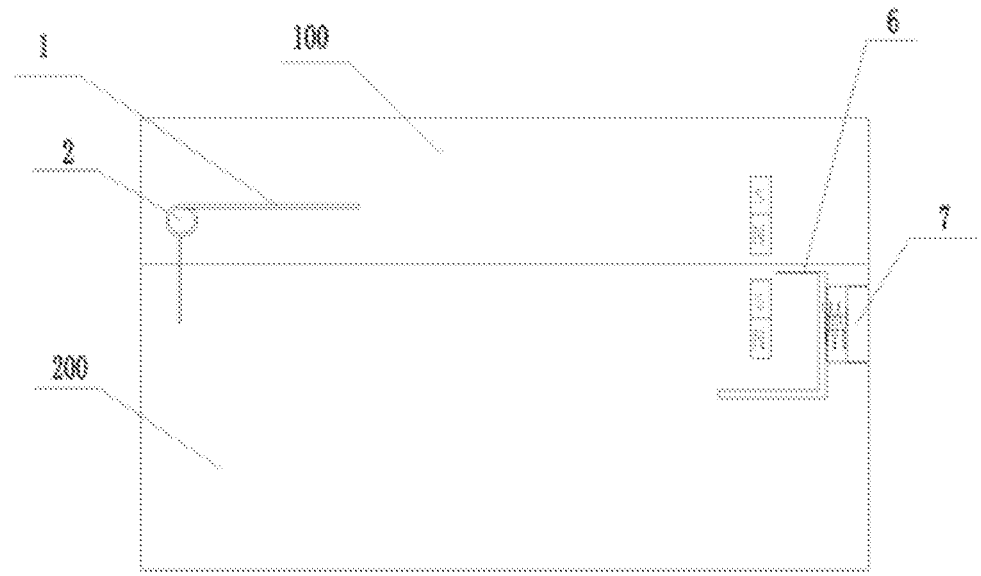
FIGS. 13-15 are schematic diagrams of the cover opening/closing mechanism of the cooking appliance in a fifth preferred embodiment of the present disclosure, showing the processes before the magnetic-shielding button is pressed, after the magnetic-shielding button is pressed, and after the cover is opened.
Figure 14:
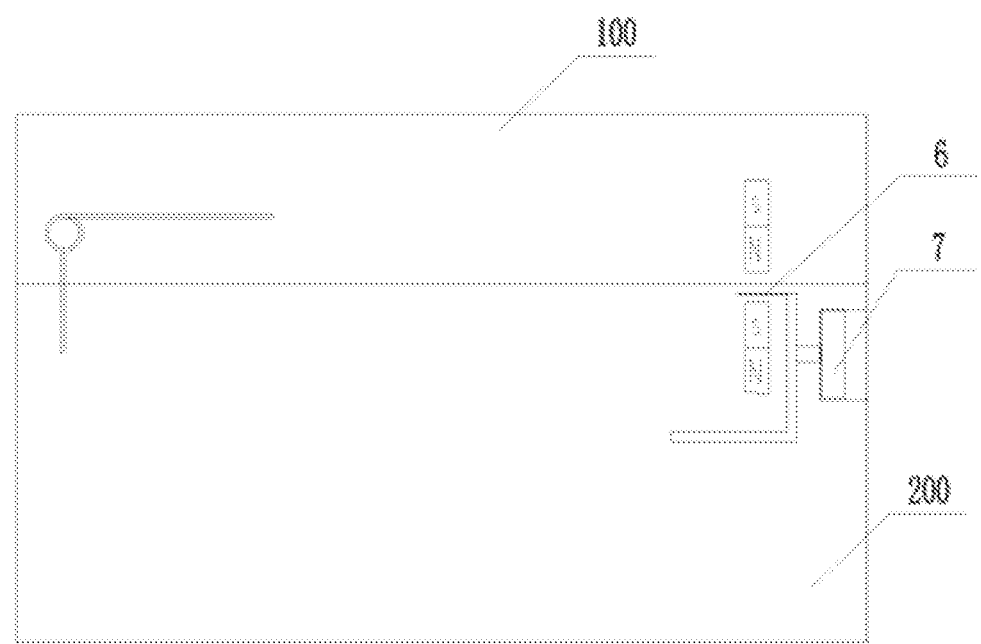
Figure 15:
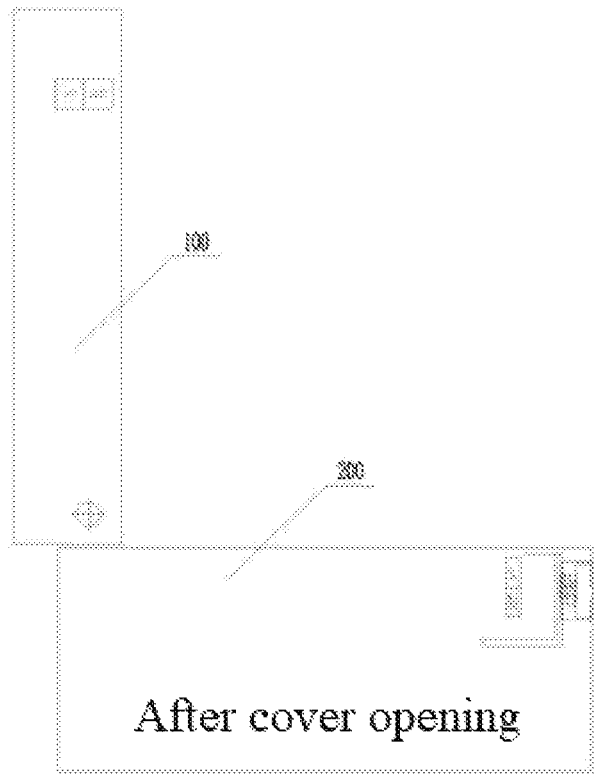

In another preferred embodiment of the present disclosure as shown in FIGS. 13-15, a magnetic-shielding assembly is additionally provided. The magnetic-shielding assembly comprises a movable magnetic-shielding sheet 6, which can be pushed into a space between an upper magnetic attraction body and a lower magnetic attraction body or moved out of the space, so as to control to open or close the cover body 100 accordingly. Compared with the electromagnet polarity reversing scheme described above, the cover opening/closing control scheme utilizing the magnetic-shielding assembly has advantages including lower cost and simpler and more convenient operation.

Wherein the function of the magnetic-shielding assembly is to controllably extend into the space between the upper magnetic attraction body and the lower magnetic attraction body (i.e. between the first attraction member and the second attraction member) to block or reduce the magnetic attraction force between them, and thereby attains the object of cover opening control.

Specifically, as shown in FIG. 13, the magnetic-shielding assembly comprises a magnetic-shielding button 7 with a return spring, and the magnetic-shielding button 7 is connected with a magnetic-shielding sheet 6 and can drive the magnetic-shielding sheet 6 to extend into the space between the upper magnetic attraction body and the lower magnetic attraction body to inhibit magnetic attraction when the button is pressed. After the cover body 100 is opened, as shown in FIG. 15, the magnetic-shielding button 7 can be released, and then the magnetic-shielding button 7 is smoothly returned by the return spring to the state before it is pressed.

Wherein the magnetic-shielding sheet 6 may be in a sheet shape and inserted between the upper magnetic attraction body and the lower magnetic attraction body. However, in order to attain a better magnetic shielding effect, the illustrated magnetic-shielding sheet 6 is preferably formed into a frame structure with an open end, and the upper magnetic attraction body or the lower magnetic attraction body is fully framed inside the frame structure when the magnetic-shielding button 7 is in the pressed state.

The magnetic-shielding sheet 6 may be made of any material capable of isolating or suppressing magnetism, which usually may be selected from aluminum sheet, aluminum alloy sheet, stainless steel sheet, or copper sheet, etc.

Since the cover body 100 needs to be opened pivotally, the magnetic-shielding button 7 serving as a cover opening button is preferably disposed at the base 200, as shown in FIGS. 13 and 14, so as to prevent touching the cover body and avoid hand scalding by the high-temperature vapor when the cover is opened.

It should be noted that the upper magnetic attraction body and the lower magnetic attraction body shown in FIGS. 13-15 magnetically attract each other in the closed state of the cover body. Both the upper magnetic attraction body and the lower magnetic attraction body may be permanent magnets, or either the upper magnetic attraction body or the lower magnetic attraction body is a permanent magnet, while the other is an iron block. Moreover, either the upper magnetic attraction body or the lower magnetic attraction body may be an electromagnet, such as an AC electromagnet connected to AC power supply. The electromagnet circuit of the electromagnet preferably is provided with a circuit switch 5 for controlling the energization of the electromagnet 5.

It should be noted that the circuit switch 5, the current reversing switch, the slide switch of the slide rheostat 8, and the magnetic-shielding button 7, etc. may be used separately as a cover opening switch or used in combination to form a combined cover opening button switch.

Figure 16:
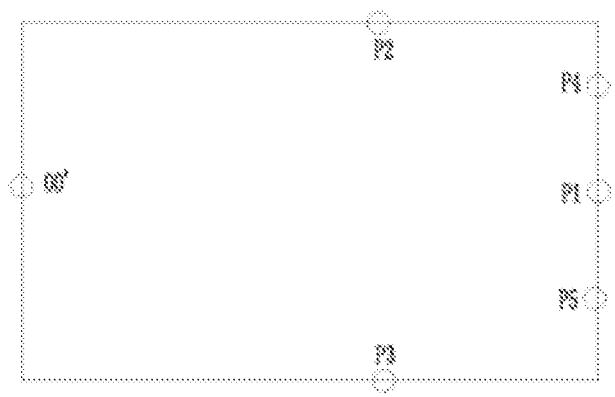
FIG. 16 shows various feasible arrangement positions of the attraction assembly in an electric cooker.

The aforesaid attraction assembly may be applied to various types of cooking appliances, especially electric cookers, for controlling the opening, closing and locking of the cover body from/to the cooker body. In practical applications, most of the electric cookers available on the market are in a rectangular shape. As shown in FIG. 16, the rectangular profile of an electric cooker comprises a first edge of rectangle, a second edge of rectangle, a third edge of rectangle, and a fourth edge of rectangle, which are connected sequentially. The pivot hinge point between the cover body 100 and the base 200 is formed at the midpoint position of the first edge of rectangle, i.e., the pivot hinge point OO' in the figure, and the attraction assembly may be arranged at the midpoint position of the third edge of rectangle and/or the attraction assembly may be arranged at a symmetrical position of the second edge of rectangle and the fourth edge of rectangle, e.g., the attraction assembly arrangement position P1, P2, P3, P4, or P5 in the figure.

Various specific embodiments of the attraction assembly for food cooking are described above. In practical applications, the design of the structural parameters should be specifically determined according to the requirements for cover opening/closing.

As shown in FIG. 6, in the closed state of the cover body 100, the return torque M2 of the pivot spring 1 is smaller than the sum of the attraction torque M3 of the magnetic attraction force between the magnet 3 and the iron core rod 4 and the gravity center torque M1 of the cover body 100 with respect to the pivot hinge point (i.e., the pivot hinge point OO' shown in FIG. 16) between the cover body 100 and the base 200. In that way, the cover locking moment can be greater than the cover opening moment in the cover opening prevention stage, and self-locking of the cover body can be realized.

Specifically, in various embodiments, when the electromagnet is not energized, the magnetic attraction force between the magnet 3 and the iron core rod 4 is relatively small, but should be enough for self-locking of the cover body. In order to ensure the safety and reliability of the self-locking of the cover body, a margin for the cover locking moment needs to be reserved, for example, a condition $M3-(M2-M1)>1$ Nm should be met, so that the cover body can be opened automatically under the internal pressure of the cooking appliance.

In the case that an electromagnet circuit is provided, the conductive winding wound around the iron core rod 4 enhances the magnetic attraction force, and the conductive electromagnet enhances the self-locking performance of the cover body, which is more in line with the margin design of the cover locking moment. However, in order to improve the magnetic induction efficiency, preferably a condition $M3-(M2-M1)<15$ Nm is met in the energized state of the electromagnet, which is helpful for reducing the power consumption of the product and prolong the service life of the electric components.

As shown in FIG. 7, in a cover opening stage in which the cover in the closed state is to be opened, the flow direction of the current flowing through the electromagnet may be reversed by means of the current reversing switch, so that the electromagnet generates magnetic repulsion force against the magnet 3 to open the cover body 100. Under that condition, when the cover body 100 is in the closed state and the electromagnet is energized, the sum of the magnetic repulsion torque M4 of the magnetic repulsion force between the magnet 3 and the electromagnet and the return torque M2 of the pivot spring 1 is greater than the gravity center torque M1 of the cover body 100 with respect to the pivot hinge point, i.e., the upward torque is greater than the downward torque in FIG. 7, and the cover body 100 can be opened.

Likewise, in order to ensure the reliability of cover opening, a margin should be design for the cover opening torque, for example, a condition $M4+M2-M1>1$ Nm should be met, to prevent the cover body from opening automatically owing to accident vibration, impact or internal pressure, etc.

Based on the above torque analysis, appropriate torsion springs and magnets, etc., may be selected purposefully according to the design parameters to achieve cover opening/closing control that meets the design requirements.

In summary, the present disclosure designs a novel magnetic attraction lock mechanism for cover opening/closing, which may be applied to products such as electric cookers and the like. By means of the magnet attraction between the upper magnet and the lower magnet, cover self-locking can be achieved by closing and locking the cover under the magnet attraction force when the cover shouldn't be opened in some operation procedures (e.g., in a rice washing process). When needed, the cover may be opened safely, for example, simply by pressing a button in the traditional way to reduce the magnetic attraction force quickly, without increasing the product cost too much. In addition, the cover opening/closing mechanism may be concealed in the cover body and the base, without affecting the appearance of the product at all.

While some preferred embodiments of the present disclosure are described above with reference to the accompanying drawings, the present disclosure is not limited to the details in those embodiments. Those skilled in the art can make modifications and variations to the technical scheme of the present disclosure, without departing from the spirit of the present disclosure. For example, the portion of the magnetic attraction lock mechanism located in the cover body may be interchanged with the portion located in the base; it is not mandatory to arrange both of the electromagnets on the cover body as shown in the figures; alternatively the electromagnets may be arranged at the base, or even the magnets on the cover body and the base may be electromagnets. The control of the magnitude of the current flowing through the electromagnets is not limited to control with a slide rheostat; instead, current of appropriate magnitude may be fed from an external current supply unit, etc. Such simple modifications and variations shall be deemed as falling in the scope of protection of the present disclosure.

In addition, it should be noted that the specific technical features described in above specific embodiments may be combined in any appropriate form, provided that there is no conflict among them. To avoid unnecessary repetition, various possible combinations are not described specifically in the present disclosure.

Moreover, different embodiments of the present disclosure may also be combined freely as needed and such combinations shall also be deemed as falling in the scope of the present disclosure, as long as the combinations don't deviate from the idea and spirit of the present disclosure.

The invention claimed is:

1. A cooking appliance comprising:
   a base;
   a cover body pivotally mounted at the base;
   a pivot spring provided at a pivot connection member between the base and the cover body; and
   an attraction assembly including a first attraction member provided at the base and a second attraction member provided at the cover body, the first attraction member and the second attraction member being configured to attract each other to lock the cover body to the base, and at least a part of the second attraction assembly being movable relative to the first attraction assembly in a direction away and toward the base when the cover body is in a closed state relative to the base.

2. The cooking appliance of claim 1, wherein in the closed state of the cover body, with respect to a pivot hinge point between the cover body and the base, a sum of a gravity center torque M1 of the cover body and an attraction torque M3 of the first attraction member and the second attraction member is larger than a return torque M2 of the pivot spring.

3. The cooking appliance of claim 2, wherein M3−(M2−M1)>1 Nm and M3−(M2−M1)<15 Nm.

4. The cooking appliance of claim 1, wherein the attraction assembly includes a magnetic attraction lock assembly provided at a distal end of cooking appliance with respect to the pivot connection member.

5. The cooking appliance of claim 4, wherein the magnetic attraction lock assembly includes:
   a magnet as one of the first attraction member the second attraction member; and
   an iron core rod as another one of the first attraction member and the second attraction member.

6. The cooking appliance of claim 5, further comprising:
   a shift lever mechanism including a shift lever switch and configured to, when being triggered, shift the iron core rod from a proximal position relative to the magnet toward a distal position relative to the magnet.

7. The cooking appliance of claim 5, wherein the iron core rod includes a telescopically movable rod configured to, in the closed state of the cover body, move between:
   a proximal position with respect to the magnet, at which, with respect to a pivot hinge point between the cover body and the base, a sum of a gravity center torque M1 of the cover body and an attraction torque M3 of a magnetic attraction force between the magnet and the iron core rod is greater than a return torque M2 of the pivot spring, so as to lock the cover body; and
   a distal position with respect to the magnet, at which the sum of the gravity center torque M1 of the cover body and the attraction torque M3 of the magnetic attraction force between the magnet and the iron core rod is smaller than the return torque M2 of the pivot spring, so as to open the cover body.

8. The cooking appliance of claim 5, further comprising:
   an electromagnet circuit including an electromagnet, the electromagnet including the iron core rod and a conductive winding wound around the iron core rod.

9. The cooking appliance of claim 8, wherein the electromagnet circuit includes a circuit switch configured to control energization of the electromagnet.

10. The cooking appliance of claim 9, wherein in an ON state of the circuit switch, the iron core rod moves from a proximal position with respect to the magnet toward a distal position with respect to the magnet so that the iron core rod is further inserted in the conductive winding of the electromagnet.

11. The cooking appliance of claim 10, wherein an end of the iron core rod proximal to the magnet is formed as a big end.

12. The cooking appliance of claim 8, wherein the electromagnet circuit includes a current reversing switch configured to switch a flow direction of a current flowing through the electromagnet to enable the electromagnet to:
   generate a magnetic repulsion force with respect to the magnet to open the cover body, or
   generate a magnetic attraction force with respect to the magnet to achieve self-locking of the cover body.

13. The cooking appliance of claim 12, wherein when the cover body is in the closed state and the electromagnet is in an energized state, with respect to a pivot hinge point between the cover body and the base, a gravity center torque M1 of the cover body is smaller than a sum of a return torque M2 of the pivot spring and a magnetic repulsion torque M4 of a magnetic repulsion force between the magnet and the electromagnet, and M4+M2−M1>1 Nm.

14. The cooking appliance of claim 8, wherein the electromagnet includes an AC electromagnet.

15. The cooking appliance according to claim 8, wherein the electromagnet circuit includes a slide rheostat including a slide switch, the slide switch being configured to be shifted to change a magnetic attraction force between the electromagnet and the magnet to lock or open the cover body.

16. The cooking appliance of claim 5, wherein the magnet includes an electromagnet.

17. The cooking appliance of claim 4, further comprising:
   a magnetic-shielding assembly including:
      a magnetic-shielding sheet made of a magnetic-shielding material; and a magnetic-shielding button including a return spring;
wherein:
- the magnetic attraction lock assembly includes a first magnetic attraction member and a second magnetic attraction member;
- the magnetic-shielding button is configured to drive the magnetic-shielding sheet to extend into a space between the first magnetic attraction member and the second magnetic attraction member to inhibit magnetic attraction and open the cover body when the magnetic-shielding button is in a pressed state.

18. The cooking appliance of claim 17, wherein the magnetic-shielding sheet has a frame structure with an open end, and the first magnetic attraction member or the second magnetic attraction member is framed inside the frame structure when the magnetic-shielding button is in the pressed state.

19. The cooking appliance of claim 17, wherein the magnetic-shielding assembly is provided in the base, and the magnetic-shielding sheet (6) includes an aluminum alloy sheet, a stainless steel sheet, or a copper sheet.

20. The cooking appliance of claim 1, wherein:
- the cover body has a rectangular profile including a first edge, a second edge, a third edge, and a fourth edge sequentially connected;
- a pivot hinge point between the cover body and the base is formed at a midpoint position of the first edge; and
- the attraction assembly is arranged at a midpoint position of the third edge and/or at symmetrical positions of the second edge and the fourth edge.

\* \* \* \* \*